Jan. 19, 1943.　　　E. M. MILLER　　　2,308,892
FILLER PIPE CAP LOCK
Filed Jan. 21, 1941　　　2 Sheets-Sheet 1

INVENTOR
Edward M. Miller
BY
Robert Robb
ATTORNEY

Jan. 19, 1943.   E. M. MILLER   2,308,892
FILLER PIPE CAP LOCK
Filed Jan. 21, 1941   2 Sheets-Sheet 2
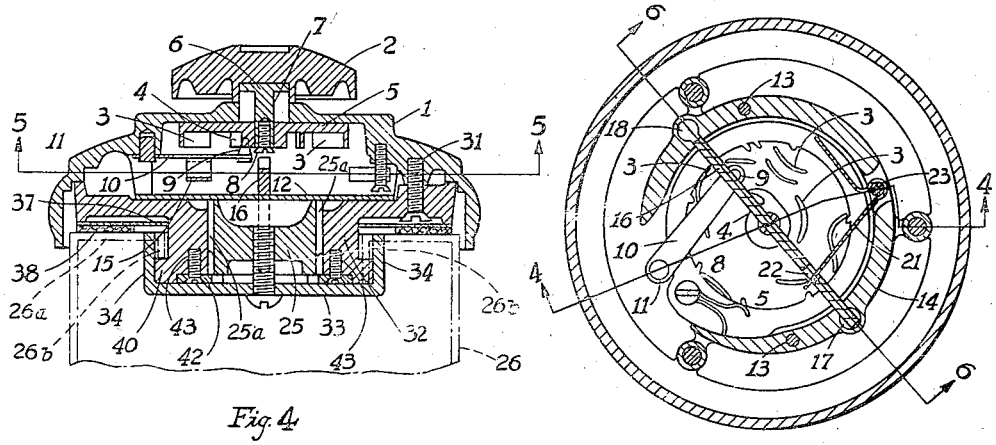
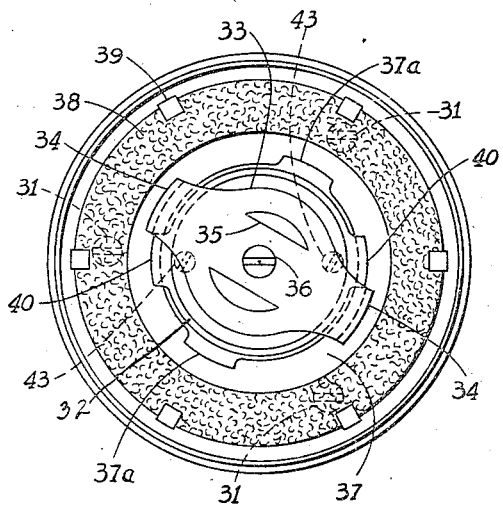
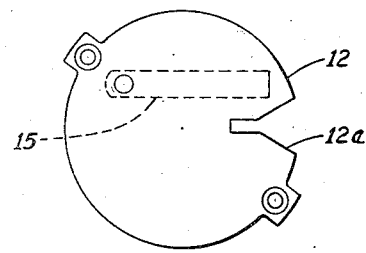
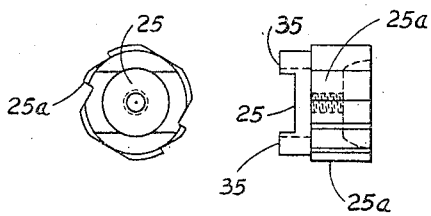
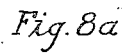
INVENTOR
Edward M. Miller
BY Robb & Robb
ATTORNEYS Patented Jan. 19, 1943

2,308,892

UNITED STATES PATENT OFFICE 2,308,892

FILLER PIPE CAP LOCK

Edward M. Miller, Kent, Ohio, assignor to The J. B. Miller Keyless Lock Company, Kent, Ohio, a corporation Application January 21, 1941, Serial No. 375,361

9 Claims. (Cl. 70—168)

This invention relates to the art of permutation or combination locks, and comprises novel compact permutation lock mechanism primarily designed for application to filler caps such as used on the filler pipes of gasolene tanks of automobiles.

My invention resides primarily in a novel arrangement of the permutation devices and operating means therefor by which a lock member mounted in the cap is adapted to be released, the permutation means working in conjunction with a latch or tumbler capable of releasing the cap and its lock member to enable the turning thereof necessary for the detachment of the cap from the filler pipe preliminary to the replenishing of the gasolene in the tank.

While my invention is disclosed herein as adapted to a common type of filler pipe equipped in the usual way with camming flanges for tightening the cap in place, and which cam is designed for automobile use as stated, it will be understood that my invention may be employed in conjunction with any tank or receptacle to be filled through a pipe such as may be used of the design that is employed customarily at the present time for filling purposes in conjunction with gasolene tanks of automotive vehicles.

My invention involves novel details of construction and assembly of the permutation and locking devices as will be more fully understood upon reference to the accompanying description and to the annexed drawings, in which—

Figure 4 is a vertical sectional view of the filler cap and lock means as when mounted upon the filler pipe of an automobile gasolene tank.

Figure 5 is a horizontal sectional view through the device taken about on the line 5—5 of Figure 4.

Figure 6 is another sectional view of the cap unit taken about on the line 6—6 of Figure 5.

Figure 7 is a bottom plan view of the cap unit as it appears completely assembled.

Figure 8 is a plan view of the ratchet member.

Figure 1:
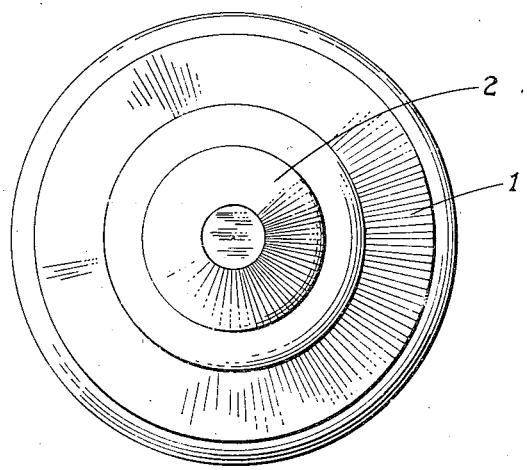
Figure 1 is a top plan view of the filler cap showing primarily the body of the cap and the operating handle for the permutation devices.
Figure 2:
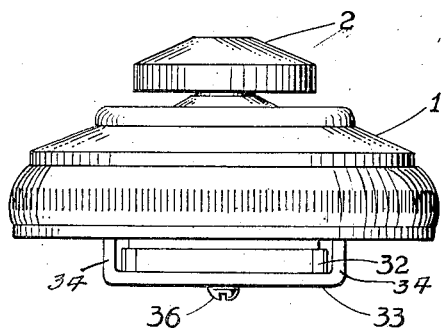
Figure 2 is a side elevation of the cap.
Figure 3:
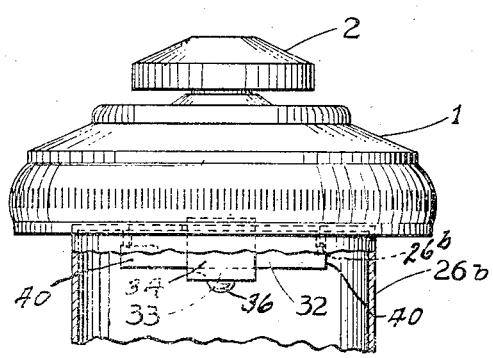
Figure 3 is a view similar to Figure 2, but illustrating the cap viewed from a different angle than Figure 2, and bringing out the manner in which the locking lugs of the lock member engage the cam flanges of the filler pipe.

Figure 8ª is a side view of the ratchet member.

Figure 9 is a plan view of the closure plate for the permutation mechanism showing more clearly the spring pressure member carried thereby.

Figure 10 is a side elevation view of the members shown in Figure 9.

Describing my invention in detail in conjunction with the drawings, and referring to the latter, I denotes the filler cap proper which is made of a design generally similar to those at present in use and involves a hollow body construction adapted to extend over and receive the upper end of a filler pipe of a gasolene tank or similar receptacle.

The cap 1 carries at its outermost portion and centrally thereof, a rotatable handle or knob 2, which is round and arranged to be readily grasped by the fingers for turning in opposite directions whereby to actuate cams 3 and a stop member 4 of the permutation or combination disc 5 of the lock mechanism. The handle 2, in other words, is designed to be moved back and forth in a rotatable manner in order to cause the cams 3 and stop 4 to operate a lever release device for the tumbler of the lock as will be shortly described.

The permutation disc 5 is attached to the handle or knob 2 by a spindle 6 fixed to the handle 2 and passing through an opening 7 in the outermost wall portion of the cap 1, a screw 8 fastening the parts 2 and 5 together so that turning of the handle 2 will compel a corresponding rotation of the disc 5 in the same direction of movement as the handle. The cams 3 of the disc 5 are arranged so as to operate upon a pin or lug 9 carried by the release lever 10, said pin or lug 9 being disposed in the paths of rotation of the cams 3. The release lever 10 is attached to the cap 1 by the pivot 11 which is secured by a press fit in a recess extending from the inner surface of the cap and the lever 10 is freely pivotally movable upon the pivot 11, as seen best in Figure 4.

In order to hold the release lever 10 with its pin 9 in the path of movement of the cams 3, I provide a plate 12 fastened by suitable screws entering an opening 13, see Figure 5, to the outer edge portion of an annular flange 14 which is integral with the cap 1 and extends downwardly from the latter in the hollow portion thereof. On this plate 12, which acts in a measure as a closure plate for the compartment in the cap 1, above the same, see Figures 4 and 6, is carried a flat pressure spring 15, and said spring bears at one end against the underside of the release lever 10, to maintain the floating body of said lever in a position with its pin 9 in the paths of movement of the cams 3. At its other end, the spring 15 is fastened or riveted in any permanent manner to the plate 12. Associated with the plate 12 and with the release lever 10 is a slide or latch member 16 which latch member, as seen best in Figures 5 and 6, has its ends slidingly received in recesses 17 and 18 in the flange 14, said recesses located at diametrically opposite portions of said flange.

The lever 10 is adapted to engage the inner side of an operating lug 19 formed by cutting out the upper edge of the latch member 16, as shown at 20. The latch member 16 is normally moved endwise in a direction toward the portion of the flange 14 remote from the release lever 10 by means of a flat spring 21, one arm of which engages the inner periphery of the flange 14, and the other arm of which enters a notch or recess 22 in the lower edge of the latch member 16. At its middle portion, the spring 21 partially encircles and thus is fixed upon a stud 23 which may be a screw carried by the flange 14.

The latch plate 16 is equipped with a latch member or lug 24 projecting downwardly therefrom or in a direction opposite to the position of the knob or handle 2 and this lug 24 cooperates with a ratchet member 25 which is round and which is adapted to remain stationary with respect to the cap 1, as later to be described, the inner end of said ratchet member 25 contacting with the underside of the plate 12 and permitting the latter to turn with the cap 1 when the said cap is revolved in the application of the same to the filler pipe 26, as later described.

The ratchet member 25 virtually operates in a bearing opening 27 provided in a lock plate 28 that closes very largely the lower hollow portion of the cap 1. The lock plate 28 has a flange 29 bearing against an interior recess 30 of the cap 1 and the lock plate is rigidly attached to turn with the cap 1 by means of a plurality of screws 31, three screws being used as disclosed in the drawings.

At its outer portion, the lock plate has a depending hub portion 32 that provides the bearing 27 for the ratchet member 25 and the ratchet member 25 is secured against displacement by means of a stop plate 33 of somewhat yoke shape as illustrated best in Figure 4, the stop or yoke plate 33 being equipped at its end with in-turned stops or lugs 34, these lugs being designed to pass through notches provided as customary at the inner-most portions of the in-turned flange 26a of the filler pipe 26. The said flange 26a is located, of course, at the mouth of the filler pipe and is the means for interlocking the cap 1 on the filler pipe owing to the provision at the inner edge of the flange 26a of the depending or inwardly extending lock cams 26b. The formation of the filler pipe 26 with its flange 26a and the cams 26b is the common construction of the filler pipes employed upon these members of ordinary automobile gasolene tanks. The stop plate 33 is interlocked with the ratchet member 25 by the formation at the outer end of said ratchet member of arc-shaped lugs 35, seen best in Figures 6 and 7.

A screw or other fastening 36 secures the stop plate 33 to the ratchet member 25, and thus the parts 33 and 35 are immovably connected and, in reference to the action of the parts, may be stated to be relatively stationary as respects the cap 1 and other parts with which the members 25 and 33 are connected.

A gasket plate 37 is seated against the underside of the closure plate 28 and carries a cork or similar gasket 38. The gasket plate 37 extends around the hub portion 32 of the said closure plate. The gasket plate 37 has small lugs 39 turned from the edge portion thereof to secure the gasket 37 from displacement.

The hub portion 32 of the closure plate 28 is equipped at opposite points on the outer periphery thereof with lock lugs 40 capable of engaging the cams of the inner flange 26b of the filler pipe 26, when and if the member 32 is turned relatively to the stops 34 of said plate 28. The closure plate 28 and gasket plate 38 comprise limiting means as will be disclosed during the description of the operation of the device.

Now with the foregoing disclosure of the construction of my cap and lock mechanism in mind, the manner in which the device is used and operated will now be set forth.

The cap and lock mechanism above set forth, that is all parts extraneous to the filler pipe 26 and its particular parts, comprises a unit which is removable from the filler pipe.

Assuming that the cap 1 or unit aforesaid has been removed from the pipe 26 and a suitable quantity of liquid or gasolene has been supplied to the tank from which the filler pipe 26 projects in the customary upward direction, the cap unit is now placed in position on the filler pipe to close the filling opening of the latter. In doing this, it is necessary that the cap 1 and its attached parts be turned to a position permitting the stops 34 of the stop plate 33 to extend into the filler pipe opening with the stops 34 engaging in the opposite notches 26b of the flange 26a of the pipe 26.

By the foregoing mounting of the cap in proper position, the lock lugs 40 on the hub 32 of the closure plate 28 will also pass through the notches of the flange 26a simultaneously with the positioning of the stops 34 in said notches.

In other words, when the cap 1 is emplaced upon the filler pipe to close the same, the lock lugs 40 will be disposed in register with and at the inner sides of the stops 34, the lugs and stops passing through the notches of the flange 26a in placing the cap in position on the filler pipe.

The next action of the parts in order to effect the locking of the cap in place on the filler pipe is to grasp the cap 1 with the hand and preferably at the outer periphery of the cap that overlaps the upper portion of the filler pipe, and thereupon, the cap 1 is turned. Now, when the cap 1 is turned, since the closure plate 28 is fixed thereto by the screws 31 along with the permutation mechanism of the lock means, the lock lugs 40 on the hub 32 will be caused to turn out of registry with the stop lugs 34 and ride on the lower edges of the cams of the flange 26b.

As the lugs 40 ride along the cams of flange 26b, the cap 1 is tightened down against the mouth of the filler pipe 26 so that the gasket 38 in contact with the mouth of the pipe tightens against the same. When the said parts of the cap unit are turned in the manner stated, the ratchet member 25 remains stationary because it is affixed to the yoke plate 33. The yoke plate must stay stationary because its stops 34 are engaged with opposite notches at the inner portions of the horizontal flange 26a at the filler pipe opening. It likewise appears that the flange 26b is now engaged with the limiting means which includes the closure plate 28 and gasket 38 and gasolene or other fluid is prevented from leaking from the filler pipe.

Now as the closure plate and cap 1 and permutation devices turn by the rotation of the cap to tighten the lock lugs 40 against the cams aforesaid, the ratchet dog or lug 24 of the latch plate 16 rides around the periphery of the ratchet member 25 engaging the teeth 25a of the latter and dropping in behind the teeth as the cap turns. Thus, when the cap has been turned and tightened so that the lugs 40 are properly engaged with the cams of the inner flange 26b of the filler pipe, the latch plate by its lug or dog 24 will have so engaged certain of the teeth 25a of the ratchet member 25 as to fall behind the abrupt sides of the teeth and lock the cap from being turned in opposite direction to bring the lugs 40 into registration and behind the stops 34, their positions necessary to permit the removal of the cap unit 1.

A metal washer 42 seated in an annular recess in the end of the hub portion 32 of the plate 28, and secured by countersunk screws 43, prevents the outward movement of the locking ratchet part 25, cooperating with screw 36 and stop plate 33 to this end. Plate 37 has notches 37a to enable it to pass the lock lugs 40 of the closure plate 32.

The cap united as described in the above adjustment of being now connected or attached to the filler pipe 26 can not be removed unauthorizedly for it is effectively locked against rotation in the necessary direction for turning around the fixed ratchet or lock member 25.

In order to turn the cap 1 in the reverse direction to that above described, the latch member 16 must be moved longitudinally or transversely across the flange 14, or across the axis of the cap so to speak to an extent permitting the ratchet lug 24 to be disposed in a position out of engagement with the teeth 25a of the member 25. For this purpose, the inner edge of the lug 24 must be slightly beyond the greatest peripheral dimension of the member 25.

Assuming that the cap unit has been locked in the manner stated, if it is desired to remove the cap, certain rotative movements of the knob or handle 2 must be effected in opposite directions. To this end, it will be understood that the owner of the cap unit knows the permutation of the lock mechanism necessary for unlocking operation.

In the construction of the device illustrated, the knob 2 will be turned in one direction until the stop 4 of the permutation parts engages the pin or projection 9 of the release lever 10. This advises the operator that the knob 2 is in its zero position, or the limit position of the knob for movement in one direction. The operator will then turn the knob 2 in a direction carrying the stop 4 away from the release pin 9, whereupon the cams 3 begin to operate upon the release lever 10 and its pin 9 flipping the lever back and forth as the knob 2 is turned.

According to the construction shown, the operator can feel the movement of the knob 2, through the engaging action of the cams 3 on the part 9, and he can hear the click of the cams disengaging from the part 9. He will turn the knob 2, in this instance, six click movements in the direction reverse to the one bringing the stop 4 in engagement with the member 9. Thereupon, he will turn the knob in a reverse direction six movements, again reverse the movement of the knob for three click movements, and finally reverse the movement of the knob for three more click movements, and when this is done, the permutation cams 3 will have caused the lever 10 to finally shift outwardly against the tension of the spring 21 a sufficient amount of movement to carry the ratchet lug 24 beyond the path of the periphery of the ratchet member 25. At this time, the cap 1 may be freely manipulated to turn into register with the stops 34, and when so registered, the lugs 40 will have been disengaged from beneath the cams of the flange 26b of the filler pipe, and have been located opposite the notches in the flange 26a of said filler pipe, and cap, and lock unit 1 may then be lifted off of the filler pipe because completely unlocked or released by the action of the release lever 10 on the latch member 16.

When the cap unit is removed from the filler pipe therefor the lugs 40 will be in register with the stops 34 and left in register so that the cap unit is ready to be replaced after filling of the tank and subjected to a mere bodily turning movement of the cap 1, whereby to reengage the lugs 40 with the flange 26b of the filler pipe and such turning movement will cause movement of the disc 5 at the same time permitting the release lever 10 to swing inwardly and thus likewise permit the latch member 16 with its ratchet lug 24 to reengage the teeth of the ratchet member 25 and hold the cap unit in locked condition upon the filler pipe until the next authorized removal thereof under the control of the permutation mechanism.

As shown in Figure 9, the plate 12 which carries the spring 15 is notched out as shown at 12a so that the ratchet lug or member 24 of the latch member 16 may pass through the plate 12 and thus be arranged in proper position for its ratcheting and locking effect relatively to the stationary member 25 and yoke plate 33.

It will be apparent that, generally speaking, the cap unit of the present invention comprises an inner stop section including primarily the parts 33, 34 and 25, which section is relatively stationary on the filler pipe. Additionally, the unit comprises a relatively movable section or assembly which is the outer section or assembly of parts including primarily the cap body 1, the closure plate 32 rotative therewith, the latch means 16 coacting with the stationary member 25, the permutation mechanism, and the operating handle 2 that is operable to release the latch mechanism and permit release movement of the cap 1 after unlocking by the permutation devices.

Having thus described my invention, what I claim as new and desire to secure by Letters Patent of the United States is:

1. In combination, a filler pipe, a filler pipe cap unit comprising an inner relatively stationary stop section, positionable upon the filler pipe, said filler pipe having cam locking portions formed therewith, an outer relatively movable section comprising a cap body movable in relation to the inner section, parts for interlocking said cap member to the cam portions of the filler pipe, lock mechanism intermediate the said sections including a member carried by the relatively stationary section, and a cooperating member carried by the relatively movable section arranged to coact with the lock member on the stationary section in a plurality of positions to prevent rotational removal operation of the cap body whilst permitting limited movement of said interlocking parts in engagement with said cam portions, in the opposite rotational direction, and an operating handle on the cap body for actuating the lock member carried by the movable section to release the locking member of the movable section and permit removal movement of the said movable section.

2. A filler pipe cap unit and filler pipe as claimed in claim 1, in which the lock member carried by the relatively stationary section is a ratchet part, and wherein the lock member carried by the relatively movable section comprises a ratchet dog cooperating with the ratchet part of the stationary section.

3. A filler pipe cap unit as described, comprising, in combination, a relatively stationary stop section having stop means to interlock with a filler pipe for preventing turning movement of said section, a stationary ratchet member on said stop section, a relatively movable outer section including a cap body rotatable on the stationary section, ratchet means on said cap body to coact with the ratchet part of the stationary stop section, permitting turning of the cap body in one direction, and adapted to lock said cap body from turning in an opposite direction until the ratchet means is released, release mechanism carried by the cap body for releasing the ratchet means intermediate the same and the stationary section, and an operating device external to the cap body for actuation of the ratchet means to effect release of the latter.

4. A filler pipe cap unit as claimed in claim 3, in which the ratchet part upon the stationary stop section is a round member having ratchet teeth on its periphery and in which the ratchet member carried by the cap body or relatively movable section includes a ratchet dog adapted to interengage with the ratchet teeth of said ratchet part, combined with permutation mechanism within the cap body including a release lever coacting with the ratchet member on the cap body, the operating device on the cap body including a handle for actuation of the permutation mechanism for effecting operation of the release lever.

5. In combination, a filler pipe, a filler pipe cap unit comprising a relatively stationary section including a stop plate having stop lugs to interengage notches formed on the filler pipe to thereby hold the stop section against turning movement, a relatively movable section carried by the stationary section and turnable in reference thereto and comprising a cap body to cover the filling opening of the filler pipe, said filler pipe including cam means formed therewith, interlocking means connected with the cap body for interlocking engagement with the cam means of the filler pipe in a plurality of positions upon turning movement of the cap body in one direction, interengaging means carried by the relatively stationary section and the cap body for locking the cap body in a plurality of positions against reverse rotation when it is turned to cause its interlocking means to interlock with the cam means of the filler pipe whilst permitting limited rotation in said one direction and a part external to the cap body for manipulating the locking means on the cap body for releasing the latter to turn in a direction opposite to the locking turning movement of said cap body.

6. A filler pipe cap unit comprising, in combination, an inner relatively stationary stop section positionable upon a filler pipe so as to interlock therewith, an outer relatively movable section comprising a cap body of hollow formation, movable in relation to the inner section, parts for interlocking said cap member to a filler pipe, lock mechanism comprising permutation devices in said hollow portion of the cap body, and intermediate the said sections including a member carried by the relatively stationary section and a cooperating member carried by the relatively movable section arranged to coact with the lock member on the relatively stationary section in a plurality of positions to prevent rotational removal operation of the cap body, and an operating handle adapted to actuate said permutation devices for effecting the release action of the lock member of the outer section of the unit.

7. A filler pipe cap unit comprising, in combination, an inner relatively stationary stop section, positionable upon a filler pipe so as to interlock therewith, an outer relatively movable section comprising a cap body of hollow formation movable in relation to the inner section, parts for interlocking said cap member to a filler pipe, lock mechanism comprising permutation devices in said hollow portion of the cap body adapted to be actuated by an operating handle on the cap body for effecting release action of the lock member of the outer section of the unit, the permutation devices including a permutation disc within the cap body having permutation cams, a release lever associated with the permutation cams for operation thereby and coacting with the lock member on the relatively movable section of the unit together with a connection between the handle and said permutation disc for the operation of the latter by the handle.

8. The combination of a filler pipe cap unit as described and a filler pipe having cam members formed therewith, said cap unit comprising an inner stop section engageable with said filler pipe for preventing turning movement of said section, an outer movable section comprising a cap body movable in relation to the inner section, limiting means on said cap body adapted to be engaged by end portions of the filler pipe, parts for interengaging said cap body with the cam members of the filler pipe, lock mechanism intermediate the said sections including a member carried by the outer section and a cooperating member carried by the inner section arranged to coact with the member on the outer section in a plurality of positions to prevent rotational movement of the cap body toward unlocked position, the rotation of the cap body in the other direction moving the said interengaging parts into closer engagement with the cam members on the filler pipe and the limiting means on the said body into abutment with the end portions of the filler pipe aforesaid, preventing further movement in said other direction.

9. The combination of a filler pipe cap unit as described and a filler pipe having cam members formed therewith, said cap unit comprising an inner stop section engageable with said filler pipe for preventing turning movement of said section, an outer movable section comprising a cap body movable in relation to the inner section, limiting means on said cap body adapted to be engaged by end portions of the filler pipe, parts for interengaging said cap body with the cam members of the filler pipe, lock mechanism intermediate the said sections including a member carried by the outer section and a cooperating member carried by the inner section arranged to coact with the member on the outer section in a plurality of positions to prevent rotational movement of the cap body toward unlocked position, whilst permitting rotational movement in the other direction, the engagement of the limiting means on the cap body with the end portions of the filler pipe preventing further movement in said other direction.

EDWARD M. MILLER.